US011777082B2

(12) United States Patent
Otsuka et al.

(10) Patent No.: US 11,777,082 B2
(45) Date of Patent: Oct. 3, 2023

(54) NEGATIVE ELECTRODE MATERIAL FOR LITHIUM ION SECONDARY BATTERIES, METHOD FOR MANUFACTURING THE SAME, PASTE FOR NEGATIVE ELECTRODE, NEGATIVE ELECTRODE SHEET, AND LITHIUM ION SECONDARY

(71) Applicants: SHOWA DENKO K.K., Tokyo (JP); UMICORE, Brussels (BE)

(72) Inventors: Yasunari Otsuka, Tokyo (JP); Nobuaki Ishii, Tokyo (JP); Nicolas Marx, Olen (BE); Stijn Put, Olen (BE)

(73) Assignees: Showa Denko K.K., Tokyo (JP); Umicore, Brussels (BE)

( * ) Notice: Subject to any disclaimer, the term of this patent is extended or adjusted under 35 U.S.C. 154(b) by 0 days.

(21) Appl. No.: 16/753,486

(22) PCT Filed: Sep. 18, 2018

(86) PCT No.: PCT/JP2018/034337
§ 371 (c)(1),
(2) Date: Apr. 3, 2020

(87) PCT Pub. No.: WO2019/069668
PCT Pub. Date: Apr. 11, 2019

(65) Prior Publication Data
US 2020/0295359 A1 Sep. 17, 2020

(30) Foreign Application Priority Data

Oct. 5, 2017 (JP) ................. 2017-195245

(51) Int. Cl.
| | |
|---|---|
| *H01M 4/36* | (2006.01) |
| *H01M 4/38* | (2006.01) |
| *H01M 4/62* | (2006.01) |
| *H01M 10/0525* | (2010.01) |
| *H01M 4/02* | (2006.01) |

(52) U.S. Cl.
CPC ........... *H01M 4/366* (2013.01); *H01M 4/386* (2013.01); *H01M 4/625* (2013.01); *H01M 10/0525* (2013.01); *H01M 2004/021* (2013.01); *H01M 2004/027* (2013.01)

(58) Field of Classification Search
CPC .... H01M 4/0471; H01M 4/364; H01M 4/366; H01M 4/386; H01M 4/40; H01M 4/665; H01M 4/666; H01M 10/0525; H01M 2004/021; H01M 2004/207
See application file for complete search history.

(56) References Cited

U.S. PATENT DOCUMENTS

| | | | | |
|---|---|---|---|---|
| 5,340,670 | A * | 8/1994 | Takami | H01M 4/587 |
| | | | | 429/231.5 |
| 6,589,696 | B2 | 7/2003 | Matsubara et al. | |
| 9,559,345 | B2 | 1/2017 | Yoon et al. | |
| 10,109,848 | B2 | 10/2018 | Murata et al. | |
| 10,637,052 | B2 * | 4/2020 | Put | H01M 10/052 |
| 2002/0009646 | A1 | 1/2002 | Matsubara et al. | |
| 2004/0214087 | A1 * | 10/2004 | Sheem | H01M 4/366 |
| | | | | 429/231.8 |
| 2013/0136986 | A1 | 5/2013 | Scoyer et al. | |
| 2013/0143127 | A1 * | 6/2013 | Nakamura | H01M 4/366 |
| | | | | 429/231.8 |
| 2014/0287315 | A1 | 9/2014 | Troegel et al. | |
| 2015/0162587 | A1 | 6/2015 | Yoon et al. | |
| 2015/0162600 | A1 | 6/2015 | Wakizaka et al. | |
| 2015/0270534 | A1 | 9/2015 | Nozato et al. | |
| 2016/0190552 | A1 | 6/2016 | Murata et al. | |
| 2016/0365567 | A1 * | 12/2016 | Troegel | H01M 4/386 |

(Continued)

FOREIGN PATENT DOCUMENTS

| | | |
|---|---|---|
| CN | 102388485 A | 3/2012 |
| CN | 105453314 A | 3/2016 |
| CN | 105900269 A | 8/2016 |

(Continued)

OTHER PUBLICATIONS

JP-2008277232-A English machine translation (Year: 2020).*
JP-2013200984-A English machine translation (Year: 2020).*
Communication dated Jul. 30, 2020, from the Korean Intellectual Property office in corresponding application No. 10-2020-7009481.
Yong-Sheng Hu et al., "Superior Storage Performance of a Si@SiO$_x$/C Nanocomposite as Anode Material for Lithium-Ion Batteries", Angewandte Chemie, vol. 47, 2008, pp. 1645-1649 (5 pages total).
Norio Iwashita et al., "Specification for a standard procedure of X-ray diffraction measurements on carbon materials", Carbon, 2004, pp. 701-714, vol. 42.
International Search Report for PCT/JP2018/034337 dated Dec. 25, 2018 [PCT/ISA/210].

(Continued)

*Primary Examiner* — Ula C Ruddock
*Assistant Examiner* — Armindo Carvalho, Jr.
(74) *Attorney, Agent, or Firm* — NK Patent Law

(57) ABSTRACT

A negative electrode material for lithium ion secondary batteries, including composite material particles containing nanosilicon particles having a 50% particle diameter ($D_{n50}$) of 5 to 100 nm in a number-based cumulative particle size distribution of primary particles, graphite particles and an amorphous carbon material; the composite material particles containing the nanosilicon particles at a content of 30 to 60 mass % or less, and the amorphous carbon material at a content of 30 to 60 mass % or less; the composite material particles having a 90% particle diameter ($D_{v90}$) in the volume-based cumulative particle size distribution of 10.0 to 40.0 μm, a BET specific surface area of 1.0 to 5.0 m²/g, and an exothermic peak temperature in DTA measurement of 830° C. to 950° C. Also disclosed is a paste for negative electrodes, a negative electrode sheet, a lithium ion secondary battery and a method for manufacturing the negative electrode material.

8 Claims, 1 Drawing Sheet

(56) References Cited

U.S. PATENT DOCUMENTS

2017/0040610 A1* 2/2017 Otsuka .................. H01M 4/364

FOREIGN PATENT DOCUMENTS

| EP | 3 093 910 A1 | | 11/2016 |
|---|---|---|---|
| JP | 06-168725 A | | 6/1994 |
| JP | 3995050 B2 | | 10/2007 |
| JP | 2008-235247 A | | 10/2008 |
| JP | 2008-277232 A | | 11/2008 |
| JP | 2008277232 A | * | 11/2008 |
| JP | 4379971 B2 | | 12/2009 |
| JP | 2013-200984 A | | 10/2013 |
| JP | 2013200984 A | * | 10/2013 |
| JP | 2017-088437 A | | 5/2017 |
| KR | 20010113448 A | | 12/2001 |
| KR | 10-2015-0075207 A | | 7/2015 |
| KR | 101561274 B1 | | 10/2015 |
| WO | 2012/000858 A1 | | 1/2012 |
| WO | 2014/003135 A1 | | 1/2014 |
| WO | 2014/136609 A1 | | 9/2014 |
| WO | 2015/019994 A1 | | 2/2015 |
| WO | 2015/159935 A1 | | 10/2015 |
| WO | WO-2015159935 A1 | * | 10/2015 .............. H01M 4/36 |

OTHER PUBLICATIONS

Japanese Office Action ("Notice of Reasons for Refusal") dated Jul. 5, 2019 for related Japanese Patent Application No. 2019-502824.
Decision to Grant a Patent dated Aug. 28, 2019 for related Japanese Patent Application No. 2019-502824.
Notice of Allowance dated Nov. 5, 2020, from the Korean Intellectual Property Office in application No. 10-2020-7009481.
Liwei Su et al., "Core double-shell Si@SiO$_2$@C nanocomposites as anode materials for Li-ion batteries", Chem. Commun., The Royal Society of Chemistry, 2010, vol. 46, pp. 2590-2592 ( 3 pages total).
EPO; Extended European Search Report for European Patent Application No. 18864258.1 dated May 17, 2021, 7 pages.
Communication dated Jan. 6, 2021 by the China National Intellectual Property Administration in application No. 201880064499.9.

* cited by examiner

[Figure 1]
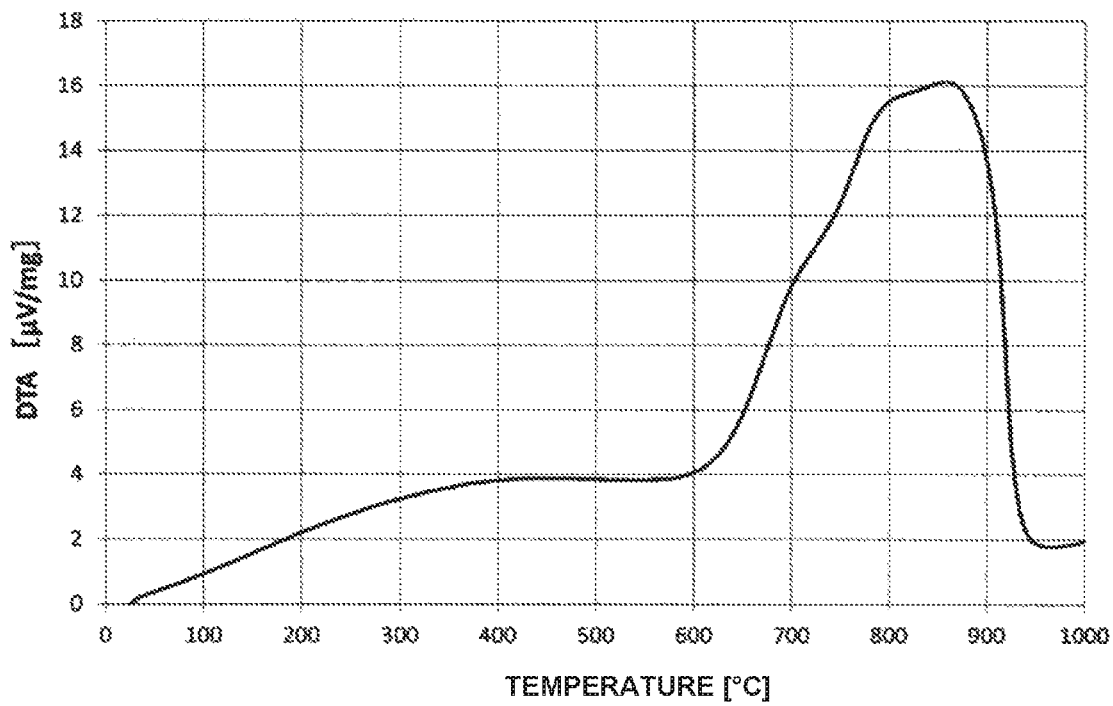
[Figure 2]
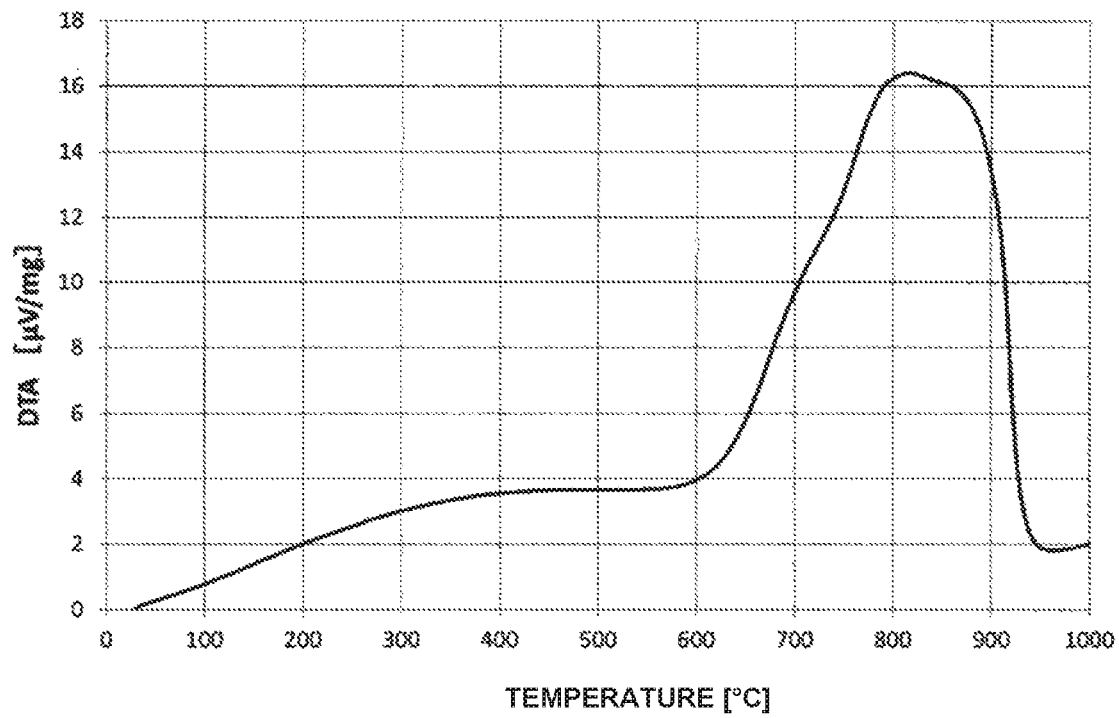

NEGATIVE ELECTRODE MATERIAL FOR LITHIUM ION SECONDARY BATTERIES, METHOD FOR MANUFACTURING THE SAME, PASTE FOR NEGATIVE ELECTRODE, NEGATIVE ELECTRODE SHEET, AND LITHIUM ION SECONDARY

CROSS REFERENCE TO RELATED APPLICATIONS

This application is a National Stage of International Application No. PCT/JP2018/034337 filed Sep. 18, 2018, claiming priority based on Japanese Patent Application No. 2017-195245 filed Oct. 5, 2017.

TECHNICAL FIELD

The present invention relates to a negative electrode material for lithium ion secondary batteries, a method for manufacturing the same, a paste for negative electrodes made from the material, a negative electrode sheet, and a lithium ion secondary battery.

BACKGROUND ART

A battery (secondary battery) used in IT equipment such as smartphones and tablet PCs, vacuum cleaners, electric tools, electric bicycles, drones, and automobiles requires a negative electrode active material having both high capacity and high output. As a negative electrode active material, silicon (theoretical capacity: 4200 mAh/g) having a theoretical capacity higher than that of currently used graphite (theoretical capacity: 372 mAh/g) has received attention.

It is, however, known that silicon (Si) causes volume expansion up to about 3 to 4 times by insertion of lithium to be self-destructed or peeled off from an electrode, so that a lithium ion secondary battery using silicon has extremely low cycle characteristics.

As a method for manufacturing a high-capacity and long-life negative electrode material, a method including making a composite of carbon and Si by mechanical energy through mechanochemical treatment of carbon and Si (Japanese Patent No. 4379971; Patent Literature 1), a method including mixing silicon particles, a graphitic material and a carbonaceous material A, mixing the resulting particles with a carbonaceous material B having a higher residual carbon ratio than the carbonaceous material A, and heating the mixture (Japanese Patent No. 3995050; Patent Literature 2), and a method including mixing and heating graphite particles, Si fine particles and amorphous carbon A, and then mixing the mixture with carbonaceous material particles selected from graphite and carbon black, and an amorphous carbon B, and heating the mixture (Japanese Patent Laid-Open No. 2008-277232; Patent Literature 3) are disclosed.

CITATION LIST

Patent Literature

Patent Literature 1: Japanese Patent No. 4379971
Patent Literature 2: Japanese Patent No. 3995050
Patent Literature 3: Japanese Patent Laid-Open No. 2008-277232

SUMMARY OF INVENTION

Technical Problem

It is known that a mechanochemical treatment to apply a compressive force and a shear force to a carbon material and a silicon compound as in Patent Literature 1 causes conversion of a part of the silicon compound to silicon carbide. Among silicon compounds, silicon carbide has only a small contribution to charge and discharge, so that the method of Patent Literature 1 causes the decrease in capacity of a negative electrode active material.

An object of the present invention is to provide a negative electrode material capable of achieving a high initial discharge capacity of 1000 mAh/g or more, a high initial Coulomb efficiency and high cycle characteristics, and a lithium ion secondary battery using the same.

Solution to Problem

The present invention includes the following.

[1] A negative electrode material for lithium ion secondary batteries, comprising composite material particles containing nanosilicon particles having a 50% particle diameter ($D_{n50}$) of 5 to 100 nm in a number-based cumulative particle size distribution of primary particles, graphite particles and an amorphous carbon material,
the composite material particles containing the nanosilicon particles at a content of 30 mass % or more and 60 mass % or less, and the amorphous carbon material at a content of 30 mass % or more and 60 mass % or less,
the composite material particles having a 90% particle diameter ($D_{v90}$) in a volume-based cumulative particle size distribution of 10.0 to 40.0 μm,
the composite material particles having a BET specific surface area of 1.0 to 5.0 m$^2$/g,
the composite material particles having an exothermic peak temperature in DTA measurement of 830° C. to 950° C.

[2] The negative electrode material for lithium ion secondary batteries according to the above item 1, wherein the composite material particles have a 50% particle diameter ($D_{v50}$) in the volume-based cumulative particle size distribution of 5.0 to 25.0 μm.

[3] The negative electrode material for lithium ion secondary batteries according to the above item 1 or 2, wherein the graphite particles have a BET specific surface area of 5.0 to 50.0 m$^2$/g.

[4] A paste for negative electrodes, comprising the negative electrode material for lithium ion secondary batteries according to any one of the above items 1 to 3.

[5] A negative electrode sheet comprising the negative electrode material for lithium ion secondary batteries according to any one of the above items 1 to 3.

[6] A lithium ion secondary battery comprising the negative electrode sheet according to the above item 5.

[7] A method for manufacturing a negative electrode material for lithium ion secondary batteries made of composite material particles, comprising the steps of:
pulverizing a mixture obtained by mixing nanosilicon particles having a 50% particle diameter (Dn50) of 5 to 100 nm in a number-based cumulative particle size distribution of primary particles and a carbon precursor at a softening point or higher temperature of the carbon precursor to obtain nanosilicon-containing particles (step 1),
treating a mixture, obtained by mixing the nanosilicon-containing particles and graphite particles, in an inert gas atmosphere at a temperature of 900° C. or more and 1200° C. or less and then pulverizing the processed mixture to obtain composite material particles (composite material particles 1) (step 2), and
treating a mixture, obtained by further mixing the composite material particles 1 with the nanosilicon-containing particles, in an inert gas atmosphere at a temperature of 900° C. or more and 1200° C. or less and then pulverizing the processed mixture to obtain composite material particles (composite material particles 2) (step 3).

[8] The method for manufacturing a negative electrode material for lithium ion secondary batteries according to the above item 7, wherein the carbon precursor is a petroleum pitch or a coal pitch.

Advantageous Effects of Invention

The negative electrode material for lithium ion secondary batteries of the present invention has excellent Si dispersibility around graphite even with a high content of Si, so that battery characteristics (initial discharge capacity, initial Coulomb efficiency and cycle characteristics) can be improved.

Although the reason why the effects described above can be obtained by the negative electrode material for lithium ion secondary batteries of the present invention is not clear, the following can be phenomenologically said. The exothermic peak observed in DTA (differential thermal analysis) measurement of the negative electrode material for lithium ion secondary batteries of the present invention indicates the combustion of an amorphous carbon material and graphite. As compared with an exothermic peak of a mixture obtained by simply mixing an amorphous carbon material and graphite, the exothermic peak temperature of a composite material in which a periphery of graphite is coated with an amorphous carbon material by heat treatment tends to be higher. In other words, in the case where the exothermic peak temperature in DTA measurement is high, it is assumed that graphite and an Si-containing amorphous carbon material can be uniformly compounded. In a method for achieving high capacity according to Patent Literature 1, 2 or 3, heat treatment is performed in a state with a high ratio of an Si-containing amorphous carbon material to graphite, so that the Si-containing amorphous carbon material around graphite is poorly dispersed and the exothermic peak temperature decreases. As a result, high initial discharge capacity, high initial Coulomb efficiency and high cycle characteristics cannot be achieved. Although it is difficult to evaluate such a complexed state by SEM (scanning electron microscope) observation or EDX (energy dispersive X-ray spectroscopy), the evaluation can be easily performed by DTA measurement.

BRIEF DESCRIPTION OF DRAWINGS

FIG. 1 is a chart showing a result of DTA measurement of composite material particles in Example 1.

FIG. 2 is a chart showing a result of DTA measurement of composite material particles in Comparative Example 1.

DESCRIPTION OF EMBODIMENTS

Hereinbelow, detailed description will be given with respect to an embodiment of a negative electrode material for lithium ion secondary batteries according to the present invention, a method for manufacturing the same, a paste for negative electrodes, a negative electrode sheet, and a lithium ion secondary battery using the same. The materials, specifications and other configurations that are described in the following embodiments are only illustrative and do not limit the scope of the invention thereto. The present invention may be modified appropriately without departing from the spirit of the invention.

The negative electrode material for lithium ion secondary batteries in an embodiment of the present invention comprises composite material particles containing nanosilicon particles, graphite particles and an amorphous carbon material.

The composite material particles constituting the negative electrode material for lithium ion secondary batteries in an embodiment of the present invention may be manufactured by a method comprising a step of pulverizing a mixture obtained by mixing nanosilicon particles having a 50% particle diameter (Dn50) in a number-based cumulative particle size distribution of primary particles of 5 to 100 nm and a carbon precursor at a temperature above the softening point of the carbon precursor to obtain nanosilicon-containing particles (step 1), treating a mixture obtained by mixing the nanosilicon-containing particles and graphite particles in an inert gas atmosphere at a temperature of 900° C. or more and 1200° C. or less and then pulverizing the processed mixture to obtain composite material particles (composite material particles 1) (step 2), and treating a mixture obtained by further mixing the composite material particles 1 with the nanosilicon-containing particles in an inert gas atmosphere at a temperature of 900° C. or more and 1200° C. or less and then pulverizing the processed mixture to obtain composite material particles (composite material particles 2) (step 3).

[Nanosilicon Particle]

The nanosilicon particles for use in the negative electrode material of the present invention have a 50% particle diameter ($D_{n50}$) in a number-based cumulative particle size distribution of primary particles of 5 to 100 nm, preferably 10 to 90 nm, more preferably 10 to 75 nm. Further, the 90% particle diameter ($D_{n90}$) in the number-based cumulative particle size distribution of primary particles is preferably 10 to 200 nm, more preferably 50 to 180 nm, and still more preferably 50 to 150 nm. With a 50% particle diameter ($D_{n50}$) in the number-based cumulative particle size distribution of the primary particles of more than 100 nm, the expansion/contraction ratio along with charge/discharge increases. With a $D_{n50}$ of less than 5 nm, the nanosilicon particles are aggregated with each other, so that the discharge capacity retention ratio decreases.

The primary particle diameter can be measured by observation with a microscope such as an SEM and a TEM (transmission electron microscope). Examples of the specific measurement method include a method including observing the nanosilicon particles at a magnification of 100,000 times using a scanning electron microscope JSM-7600 (manufactured by JEOL Ltd.) and image-processing the photographed image for measurement of the particle diameter. For example, the maximum length of each of particles (diameter of circumscribed circle of particle) identified in a photographed image using an image processing software HALCON (registered trademark, manufactured by MVTec Software GmbH) except for particles of which the entire particle is not photographed at the edge of an observation field of view, can be measured as particle diameter. Such measurement is performed on 200 particles to obtain a number-based cumulative particle size distribution, from which the 50% particle diameter ($D_{n50}$) and the 90% particle diameter ($D_{n90}$) can be calculated.

It is preferable that the nanosilicon particles for use in the negative electrode material of the present invention have a particle surface layer containing $SiO_x$ ($0<x\leq2$). The portion other than the surface layer (core) may be made of elemental silicon or may be made of $SiO_x$ ($0<x\leq2$). It is preferable that the average thickness of the surface layer containing $SiO_x$ be 0.5 to 10.0 nm. With an average thickness of the surface layer containing $SiO_x$ of 0.5 nm or more, oxidation by air or an oxidizing gas can be inhibited. With an average thickness of the surface layer containing $SiO_x$ of 10 nm or less, an increase in irreversible capacity in a first cycle can be inhibited. The average thickness can be measured by a TEM photograph.

The nanosilicon particles may contain, in addition to silicon, an element M selected from other metal elements and metalloid elements (e.g., carbon element and boron element) in the particles. Examples of the element M include nickel, copper, iron, tin, aluminum and cobalt. The content of the element M is not particularly limited as long as the effect of silicon is not significantly impeded, being, for example, 1 mole or less per 1 mole of silicon atoms.

The method for manufacturing the nanosilicon particles is not particularly limited. For example, the nanosilicon particles can be manufactured by a method disclosed in International Publication No. WO 2012/000858.

The content of the nanosilicon particles for use in the present invention in the composite material particles is 30 mass % or more, preferably 32 mass % or more, and more preferably 35 mass % or more. With a content of the nanosilicon particles in the composite material particles of less than 30 mass %, it becomes difficult to obtain a discharge capacity of 1000 mAh/g or more. Also, the content of the nanosilicon particles for use in the present invention in the composite material particles is 60 mass % or less, preferably 55 mass % or less, and more preferably 50 mass % or less. With a content of the nanosilicon particles in the composite material particles of more than 60 mass %, it becomes difficult to obtain good cycle characteristics.

The content of the nanosilicon particles in the composite material particles can be measured by ICP (inductively coupled plasma) emission spectroscopy.

[Amorphous Carbon Material]

The amorphous carbon material for use in the negative electrode material of the present invention can be manufactured from a carbon precursor. The carbon precursor may include nanosilicon particles, and examples thereof include a material that binds to graphite particles by heat treatment and converts to carbon at a high temperature of 900° C. or more. The carbon precursor is not particularly limited, and preferably a petroleum-derived substance such as a thermosetting resin, a thermoplastic resin, a thermal heavy oil, a thermal decomposition oil, a straight asphalt, a blown asphalt, and a tar or petroleum pitch by-produced during ethylene production, and a coal-derived material such as a coal tar produced in dry distillation of coal, a heavy component of coal tar with low boiling point components removed by distillation, and a coal tar pitch (coal pitch); and particularly preferably a petroleum pitch and a coal pitch. The pitch is a mixture of a plurality of polycyclic aromatic compounds. Use of the pitch enables to manufacture a carbonaceous material with less impurities at a high carbonization ratio. Since the pitch has a low oxygen content, the nanosilicon particles are hardly oxidized when dispersed in a carbon precursor.

The softening point of the pitch is preferably 80 to 300° C. With a softening point of 80° C. or more, polycyclic aromatic compounds constituting the pitch have a large average molecular weight with a small volatile content, so that the carbonization ratio tends to increase. Also, with a softening point of 80° C. or more, a carbonaceous material having a small number of pores with a relatively small specific surface area tends to be obtained, which is preferred. With a softening point of the pitch of 300° C. or less, the viscosity when melted decreases, so that uniform mixing with the nanosilicon particles is easily achieved, which is preferred. The softening point of the pitch can be measured according to the Mettler method described in ASTM-D3104-77.

The pitch as carbon precursor has a carbonization ratio of preferably 20 to 80 mass %, more preferably 25 to 75 mass %. With use of a pitch having a carbonization ratio of 20 mass % or more, a carbonaceous material having a small specific surface area tends to be obtained. On the other hand, a pitch having a carbonization ratio of 80 mass % or less has a low viscosity when melted, so that it becomes easy to uniformly disperse the nanosilicon particles.

The carbonization ratio is determined by the following method. A solid pitch is pulverized in a mortar or the like, and the pulverized product is subjected to thermogravimetric analysis under a nitrogen gas flow. In the present specification, the ratio of the mass at 1100° C. to the charged mass is defined as the carbonization ratio. The carbonization ratio corresponds to the amount of fixed carbon measured at a carbonization temperature of 1100° C. in JIS K2425.

The pitch has a QI (quinoline-insoluble) content of preferably 0 to 10 mass %, more preferably 0 to 5 mass %, still more preferably 0 to 2 mass %. The QI content of pitch is a value corresponding to the amount of free carbon. In an emerging process of mesophase spheres in heat treatment of a pitch containing a large amount of free carbon, the free carbon adheres to the surface of the sphere to form a three-dimensional network, hindering the growth of the sphere, so that a mosaic texture tends to be formed. On the other hand, in heat treatment of a pitch containing a small amount of free carbon, mesophase spheres tend to grow large to form needle coke. With a QI content in the range described above, the electrode characteristics are further improved.

The pitch has a TI (toluene insoluble) content of preferably 10 to 80 mass %, more preferably 30 to 70 mass %, still more preferably 50 to 70 mass % t. With a TI content of 10 mass % or more, polycyclic aromatic compounds constituting the pitch have a large average molecular weight with a small volatile content, so that the carbonization ratio tends to increase. As a result, a carbonaceous material having a small number of pores with a small specific surface area tends to be obtained. With a TI content of 80 mass % or less, polycyclic aromatic compounds constituting the pitch have a small average molecular weight, so that the carbonization ratio decreases. The viscosity of the pitch, however, decreases, so that uniform mixing with nanosilicon particles is easily achieved. With a TI content in the range described above, the pitch and other components can be uniformly mixed, and a composite material having characteristics suitable for an electrode active material can be obtained.

The QI content and the TI content of the pitch can be measured in accordance with JIS K2425.

[Nanosilicon-Containing Particle and Method for Manufacturing the Same]

Particles of a carbon precursor in which nanosilicon particles are dispersed are referred to as nanosilicon-containing particles. As the method for manufacturing the same, a method including uniformly mixing (kneading) the carbon precursor and the nanosilicon particles by a twin screw extruder is preferred. When the carbon precursor and the nanosilicon particles are kneaded, it is preferable that the heating temperature be set at the softening point or more of the carbon precursor, and nitrogen gas be made to flow in the system to prevent the oxidation of the nanosilicon particles and the carbon precursor.

Examples of the method of feeding raw material include a method of feeding dry blended nanosilicon particles and the carbon precursor from a hopper, and a method of feeding the carbon precursor from a hopper and feeding the nanosilicon particles from a side.

It is preferable that the carbon precursor with nanosilicon particles uniformly dispersed by kneading with a twin-screw extruder be finely pulverized to have 50% particle diameter ($D_{v50}$) in a volume-based cumulative particle size distribution of 3 to 20 µm. The diameter ($D_{v50}$) is more preferably 3 to 15 µm, still more preferably 5 to 13 µm.

With a $D_{v50}$ of nanosilicon-containing particles of 3 µm or more, it is unnecessary to significantly reduce the amount of raw material supplied during fine pulverizing, so that no reduction in productivity occurs. With a $D_{v50}$ of nanosilicon-containing particles of 20 µm or less, the size of the composite particles does not become too large and becomes appropriate when mixed with a conductive filler and heat-treated, so that no reduction in the number of the nanosilicon-containing particles per mass of the composite particles occurs. As a result, effective compounding with many conductive fillers can be achieved.

The content of the nanosilicon particles in a nanosilicon-containing particle comprising the nanosilicon particles and a carbon precursor is preferably 30 to 60 mass %, more preferably 30 to 55 mass %, still more preferably 35 to 55 mass %. With a content of nanosilicon particles of 30 mass % or more, the proportion of the carbon precursor is not too high and the binding force obtained by heat treatment is not too strong, so that it is unnecessary to increase the pulverizing force to obtain a fine particle negative electrode material and no excessive damage is given to the particles. With a content of the nanosilicon particles of 60 mass % or less, the nanosilicon particles are easily dispersed uniformly in the carbon precursor, so that the nanosilicon particles can be easily coated with the carbon precursor. Further, compounding with a conductive filler can be easily performed during heat treatment.

The amount of the amorphous carbon material for use in the present invention contained in the composite material particles is 30 mass % or more, preferably 32 mass % or more, more preferably 35 mass % or more. Also, the amount of the amorphous carbon material for use in the present invention in the composite material particles is 60 mass % or less, preferably 55 mass % or less, more preferably 50 mass % or less. With an amount of the amorphous carbon material in the composite material particles of less than 30 mass %, the nanosilicon particles cannot be sufficiently coated with the amorphous carbon material, so that the discharge capacity retention ratio decreases. With an amount of the amorphous carbon material of more than 60 mass %, the initial Coulomb efficiency decreases.

[Graphite Particle]

The graphite particles for use in the negative electrode material of the present invention have an average interplanar distance $d_{002}$ between (002) planes calculated from analysis of an X-ray diffraction pattern by CuKα line of preferably 0.3370 nm or less. The smaller the $d_{002}$ is, the larger the amount of insertion and deinsertion of lithium ions per mass is, which contributes to improvement in mass energy density. Note that with a $d_{002}$ of 0.3370 nm or less, most of the optical textures observed by a polarization microscope are optical anisotropic textures.

The graphite particles have a thickness Lc in the C-axis direction of a crystallite calculated from analysis of an X-ray diffraction pattern by CuKα line of preferably 50 to 1000 nm. With a large $L_c$, the energy density per volume of the battery is high, which is advantageous. From the viewpoint of increasing the energy density per volume, $L_c$ is more preferably 80 to 300 nm, still more preferably 100 to 200 nm. With a small $L_c$, the cycle characteristics of the battery are maintained, which is advantageous. From the viewpoint of maintaining the cycle characteristics of the battery, $L_c$ is more preferably 50 to 200 nm, still more preferably 50 to 100 nm.

Note that $d_{002}$ and $L_c$ can be measured by powder X-ray diffraction (XRD) method (refer to Iwashita et al.: Carbon, vol. 42 (2004), p. 701-714).

The graphite particles have a 50% particle diameter ($D_{v50}$) in a volume-based cumulative particle size distribution of preferably 1.0 to 15.0 µm, more preferably 3.0 to 12.0 µm, still more preferably 4.0 to 10.0 µm. With a $D_{v50}$ of 1.0 µm or more, side reactions hardly occur during charge and discharge, and with a $D_{v50}$ of 15.0 µm or less, lithium ion diffusion in the negative electrode material is fast and the charge and discharge rate tends to be improved.

The $D_{v50}$ can be measured by a laser diffraction-type particle size distribution analyzer such as Mastersizer (registered trademark) manufactured by Malvern Instruments.

The graphite particles have a BET specific surface area of preferably 5.0 to 50.0 m²/g, more preferably 5.0 to 30.0 m²/g, still more preferably 7.0 to 20.0 m²/g. With a BET specific surface area in the range, an area in contact with electrolytic solution can be secured large without using an excessive amount of binder, so that lithium ions can be smoothly inserted and deinserted, and a reaction resistance of the battery can be reduced. The BET specific surface area is calculated from the amount of nitrogen gas adsorbed. Examples of the measurement apparatus include NOVA-1200 manufactured by Yuasa Ionics Co., Ltd.

The method for manufacturing graphite particles is not particularly limited. For example, the manufacturing can be performed by a method disclosed in International Publication No. WO 2014/003135 (US 2015/162600 A1).

[Negative Electrode Material (Composite Material Particle)]

The composite material particle for use in the negative electrode material of the present invention comprises nanosilicon particles, graphite particles and an amorphous carbon material, of which at least a part is preferably compounded with each other. The compounding is, for example, a state in which the nanosilicon particles and the graphite particles are fixed and bonded through the amorphous carbon material, or a state in which at least one of the nanosilicon particles and the graphite particles is coated with the amorphous carbon material.

In the present invention, it is preferable that the nanosilicon particles be completely covered with the amorphous carbon material with the surface of the nanosilicon particles not exposed, and in particular, a state in which the nanosilicon particles and the graphite particles are linked through the amorphous carbon material and the whole is covered with the amorphous carbon material, and a state in which the nanosilicon particles and the graphite particles are in direct contact and the whole is covered with the amorphous carbon material, are preferred. When used as a negative electrode material in a battery, the nanosilicon particles with a surface not exposed inhibits decomposition reaction of electrolytic solution, so that the Coulomb efficiency can be kept high. The nanosilicon particles and the graphite particles are linked through the amorphous carbon material, so that the conductivity therebetween can be enhanced. The nanosilicon particles are covered with the amorphous carbon material, so that the volume change along with the expansion and contraction thereof can be reduced.

The composite material particles for use in the present invention have a 10% particle diameter ($D_{v10}$) in the volume-based cumulative particle size distribution of the negative electrode material measured by a laser diffraction method of preferably 3.5 to 9.0 μm, more preferably 5.0 to 8.0 μm. With a $D_{v10}$ of 3.5 μm or more, sufficient bonding strength between the negative electrode material and a current collector can be obtained, so that the negative electrode material does not peel off during charge and discharge. With a $D_{v10}$ of 9.0 μm or less, fine particles are appropriately contained, so that the electrode density can be increased during manufacturing of the electrode.

The composite material particles for use in the present invention have a 50% particle diameter ($D_{v50}$) in the volume-based cumulative particle size distribution of the negative electrode material measured by a laser diffraction method of preferably 5.0 to 25.0 μm, more preferably 8.0 to 20.0 μm. With a $D_{v50}$ of 5.0 μm or more, an appropriate bulk density of the negative electrode material can be obtained, so that the electrode density can be increased. With a $D_{v50}$ of 25.0 μm or less, the electrode density can be increased during manufacturing of the electrode.

The composite material particles for use in the present invention have a 90% particle diameter ($D_{v50}$) in the volume-based cumulative particle size distribution of the negative electrode material measured by a laser diffraction method of 10.0 to 40.0 μm, preferably 13.0 to 30.0 μm, more preferably 15.0 to 25.0 μm. With a $D_{v90}$ of less than 10.0 μm, the classification efficiency and the productivity tend to significantly decrease. With a $D_{v90}$ of more than 40.0 μm, when lithium is inserted into or deinserted from the coarse active material, large expansion and contraction occur locally, resulting in an origin of destruction of the electrode structure.

The composite material particles for use in the present invention have a BET specific surface area of 1.0 to 5.0 m²/g, preferably 1.5 to 4.0 m²/g, more preferably 2.0 to 3.5 m²/g. With a BET specific surface area of more than 5.0 m²/g, the irreversible capacity increases due to the decomposition of the electrolytic solution, so that the initial Coulomb efficiency decreases. With a BET specific surface area of less than 1.0 m²/g, the output characteristics are degraded.

The composite material particles for use in the present invention have an exothermic peak temperature of 830 to 950° C., preferably 850 to 950° C. in DTA (differential thermal analysis) measurement. It is assumed that the value indicates whether the Si-containing amorphous carbon material is uniformly compounded around the graphite. With an exothermic peak temperature of less than 830° C., it is presumed that the dispersibility of the Si-containing amorphous carbon material around the graphite is bad, so that local expansion and contraction increase, resulting in an origin of destruction of the electrode structure. Also, an exothermic peak temperature of more than 950° C. corresponds to a state in which the amount of amorphous carbon in the composite material particles is insufficient, so that the nanosilicon particles cannot be sufficiently coated with the amorphous carbon, resulting in decrease in the discharge capacity retention ratio.

[Mixing of Nanosilicon-Containing Particle and Graphite Particle]

As a mechanism for mixing the nanosilicon-containing particles and graphite particles, general transfer mixing, diffusion mixing, and shear mixing may be used.

Examples of the mixing apparatus include a stirring and mixing apparatus with a container in which a stirring blade rotates, a flow mixing apparatus in which raw materials are made to flow with air flow, and a mixing apparatus using gravity in which a container itself rotates such as a V-type mixer.

As an apparatus for mixing the nanosilicon-containing particles and graphite, a stirring and mixing apparatus is preferred, and a Henschel mixer (manufactured by Japan Coke and Engineering Co., Ltd.), a Nauta mixer (manufactured by Hosokawa Micron Corporation), a Vitomix (manufactured by Hosokawa Micron Corporation), a Cyclomix (registered trademark, manufactured by Hosokawa Micron Corporation) or the like may be used.

Use of a mechanochemical apparatus such as ball mill which imparts a compressive force and a shear force at the same time, however, causes reaction between the nanosilicon particles and carbon or formation of an intermediate even at low temperatures, so that silicon carbide is easily produced by heat treatment.

Heat treatment of the mixture of nanosilicon-containing particles and graphite is performed at preferably 900 to 1200° C., more preferably 1000 to 1100° C. By the heat treatment, the carbon precursor constituting the nanosilicon-containing particles is melted to bind to graphite, and then compounded by carbonization. With a heat treatment temperature of 900° C. or more, carbonization of the carbon precursor is sufficiently performed, so that hydrogen and oxygen do not remain in the negative electrode material. On the other hand, with a heat treatment temperature of 1200° C. or less, the nanosilicon particles are not converted to silicon carbide.

It is preferable that the heat treatment be performed in an inert gas atmosphere. Examples of the inert gas atmosphere include an atmosphere of inert gas such as argon gas or nitrogen gas made to flow in a heat treatment system.

It is preferable that the heat treatment described above be performed after addition of 35 mass % or less of the carbon precursor to the total mass of a mixture of the nanosilicon-containing particles, made of nanosilicon particles and carbon precursor, and graphite. The addition of the carbon precursor in amount of 35 mass % or less for the heat treatment inhibit the carbon precursor from agglomerating when melted, so that good dispersibility of nanosilicon particles can be obtained. The heat treatment may be performed in two steps to further improve the dispersibility.

[Paste for Negative Electrode]

The paste for negative electrodes for use in the present invention comprises the negative electrode material described above, a binder, a solvent, and a conductive aid or the like as necessary. The paste for negative electrodes is obtained, for example, by kneading the negative electrode material, the binder, the solvent, and the conductive aid or the like as necessary. The paste for negative electrodes can be formed into a sheet, a pellet, or the like.

Examples of the binder include polyethylene, polypropylene, ethylene propylene terpolymer, butadiene rubber, styrene butadiene rubber, butyl rubber, acrylic rubber, and a polymer compound having a high ionic conductivity. Examples of the polymer compound having a high ionic conductivity include polyvinylidene fluoride, polyethylene oxide, polyepichlorohydrin, polyphosphazene, and polyacrylonitrile. The amount of the binder for use in the paste is preferably 0.5 to 100 parts by mass relative to 100 parts by mass of the negative electrode material.

The conductive aid is not particularly limited as long as it plays the role of imparting conductivity and electrode stability (buffering effect against volume change in insertion and deinsertion of lithium ions) to the electrode. Examples thereof include a carbon nanotube, a carbon nanofiber, a vapor-grown carbon fiber (for example, "VGCF (registered trademark)" manufactured by Showa Denko K.K.), a conductive carbon black (for example, "Denka Black (registered trademark)" manufactured by Denka Company Limited, "Super C65" manufactured by Imerys Graphite & Carbon, "Super C45" manufactured by Imerys Graphite & Carbon), and a conductive graphite (for example, "KS6L" manufactured by Imerys Graphite & Carbon, and "SFG6L" manufactured by Imerys Graphite & carbon). Also, two or more types of the conductive aids may be used. The amount of the conductive aid for use in the paste is preferably 5 to 100 parts by mass relative to 100 parts by mass of the negative electrode material.

The solvent is not particularly limited, and examples thereof include N-methyl-2-pyrrolidone, dimethylformamide, isopropanol, and water. When water is used as the solvent, it is preferable that a thickener be used in combination. The amount of the solvent is appropriately determined so as to obtain the viscosity of the paste for easy application to a current collector.

[Negative Electrode Sheet]

The negative electrode sheet for use in the present invention has a current collector and an electrode layer to cover the current collector. Examples of the current collector include a nickel foil, a copper foil, a nickel mesh, and a copper mesh. The electrode layer contains a binder and the negative electrode material described above. The electrode layer can be obtained, for example, by applying the negative electrode paste described above to a current collector and drying the paste. The application method of the paste is not particularly limited. The thickness of the electrode layer is usually 50 to 200 μm. With a thickness of the electrode layer of 200 μm or less, the negative electrode sheet can be accommodated in a standardized battery container. The thickness of the electrode layer can be adjusted by the amount of paste applied. The thickness of the electrode layer can be also adjusted by pressing after drying the paste. Examples of the pressing method include a method such as pressing with a roll and pressing with a plate. The pressure in pressing is preferably 100 to 500 MPa (1 to 5 t/cm$^2$). The electrode density of a negative electrode sheet can be calculated as follows. The negative electrode sheet (current collector+electrode layer) after pressing is punched into a circular shape having a diameter of 16 mm, and the mass and thickness thereof are measured. From the measured values, the mass and thickness of the current collector (circular shape having a diameter of 16 mm), which is measured separately, are subtracted to obtain the mass and thickness of the electrode layer. Based on the values, the electrode density is calculated.

[Lithium Ion Secondary Battery]

The lithium ion secondary battery of the present invention comprises at least one selected from the group consisting of a non-aqueous electrolytic solution and a non-aqueous polymer electrolyte, a positive electrode sheet, and the negative electrode sheet described above.

As the positive electrode sheet, a sheet conventionally used in lithium ion secondary batteries, specifically, a sheet comprising a positive electrode active material, can be used. In the positive electrode of a lithium ion secondary battery, a lithium-containing transition metal oxide is usually used as a positive electrode active material. Preferably, an oxide mainly containing at least one transition metal element selected from Ti, V, Cr, Mn, Fe, Co, Ni, Mo and W and lithium, which is a compound having a molar ratio of lithium to the transition metal element (lithium/transition metal element) of 0.3 to 2.2, is used. More preferably, an oxide mainly containing at least one transition metal element selected from V, Cr, Mn, Fe, Co and Ni and lithium, which is a compound having a molar ratio of lithium to the transition metal element of 0.3 to 2.2, is used. Incidentally, Al, Ga, In, Ge, Sn, Pb, Sb, Bi, Si, P, B, and the like may be contained in a range of 30 mol % or less relative to the transition metal element. Among the positive electrode active materials described above, it is preferable that at least one of the materials having a spinel structure represented by a general formula $Li_yMO_2$ (M is at least one of Co, Ni, Fe and Mn. y=0 to 1.2) or $Li_zN_2O_4$ (N includes at least Mn. z=0 to 2) be used.

The non-aqueous electrolytic solution and the non-aqueous polymer electrolyte for use in the lithium ion secondary battery are not particularly limited. Examples thereof include an organic electrolytic solution comprising a lithium salt such as $LiClO_4$, $LiPF_6$, $LiAsF_6$, $LiBF_4$, $LiSO_3CF_3$, and $CH_3SO_3Li$ dissolved in an non-aqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, and γ-butyrolactone; a gel polymer electrolyte containing polyethylene oxide, polyacrylonitrile, polyvinylidene fluoride, polymethyl methacrylate or the like; and a solid polymer electrolyte containing a polymer or the like having ethylene oxide bonds.

Also, a small amount of substance that causes a decomposition reaction at an initial charge of a lithium ion secondary battery may be added to the electrolytic solution. Examples of the substance include vinylene carbonate (VC), biphenyl, propane sultone (PS), fluoroethylene carbonate (FEC) and ethylene sultone (ES). The amount added is preferably 0.01 to 50 mass %.

Also, a small amount of substance that causes a decomposition reaction at an initial charge of a lithium ion secondary battery may be added to the electrolytic solution. Examples of the substance include vinylene carbonate (VC), biphenyl, propane sultone (PS), fluoroethylene carbonate (FEC) and ethylene sultone (ES). The amount added is preferably 0.01 to 50 mass %.

A separator may be provided between the positive electrode sheet and the negative electrode sheet of a lithium ion secondary battery. Examples of the separator include a nonwoven fabric, a cloth, a microporous film, and a combination thereof mainly made of polyolefin such as polyethylene and polypropylene.

A lithium ion secondary battery can be used as a power source for electronic devices such as smartphones, tablet PCs and portable information terminals; a power source for motors of electric tools, vacuum cleaners, electric bicycles, drones, and electric vehicles; and a storage of power obtained by fuel cells, solar power generation, and wind power generation.

EXAMPLES

The present invention will be specifically described with reference to Examples and Comparative Examples as follows, though the scope of the present invention is not limited to Examples. In Examples and Comparative Examples, the average interplanar distance ($d_{002}$), the thickness ($L_c$) of crystallites in the C-axis direction in X-ray diffraction, and the particle diameter ($D_{n50}$, $D_{v10}$, $D_{v50}$, and $D_{v90}$), and the specific surface area in the BET method are measured by the method described in the "Description of embodiments" of the present specification. Moreover, the measurement of other physical properties and the evaluation of batteries were performed as follows.

[DTA Measurement]

DTA (differential thermal analysis) is a method of measuring the temperature difference between a sample and a reference substance as a function of temperature while changing the temperature of the sample and the reference substance by a fixed program (JIS K 0129 "General rules for thermal analysis"). Measurement was performed under the following conditions to obtain the exothermic peak temperature.

As an apparatus for DTA measurement, a thermogravimetric differential thermal analyzer (TG-DTA) capable of performing thermogravimetric measurement (TG) in parallel is widely used, which was used in the measurement.

Measurement apparatus: TG-DTA 2000SA (manufactured by NETZSCH Japan K.K.)

Measurement temperature: room temperature to 1000° C.
Heating rate: 20° C./min
Measurement atmosphere: air atmosphere The sample placed in an aluminum pan (diameter: 5.2 mm, height: 5.1 mm) was measured after sufficient tapping.

[Manufacturing of positive electrode]

While appropriately adding N-methyl-pyrrolidone to 90 g of $LiCoO_2$, 5 g of carbon black (SUPER C 45, manufactured by Imerys Graphite & Carbon) as conductive aid and 5 g of polyvinylidene fluoride (PVdF) as a binder, the mixture was stirred and mixed to obtain a paste for positive electrode in a slurry form.

The positive electrode paste described above was applied onto an aluminum foil with a thickness of a 20 μm by a roll coater and dried to obtain a positive electrode sheet. The dried electrode was roll-pressed to have a density of 3.6 g/cm$^3$, so that a positive electrode sheet for evaluation of a battery was obtained.

[Manufacturing of Negative Electrode Sheet]

Styrene butadiene rubber (SBR) and carboxymethylcellulose (CMC) were used as binders.

Specifically, an aqueous solution of SBR dispersed with a solid content of 40 mass %, and an aqueous solution of CMC powder dissolved with a solid content of 2 mass % were obtained.

A carbon black (SUPER C 45, manufactured by Imerys Graphite & Carbon) and a vapor growth carbon fiber (VGCF (registered trademark)-H, manufactured by Showa Denko K.K.) were prepared as conductive aids, both of which were mixed at a ratio of 3:2 (mass ratio) to obtain a mixed conductive aid.

A paste for negative electrode was obtained by mixing 90 parts by mass of the negative electrode material manufactured in Examples and Comparative Examples described below, 5 parts by mass of the mixed conductive aid, an aqueous solution of CMC (2.5 parts by mass in terms of solid content), and an aqueous solution of SBR (2.5 parts by mass in terms of solid content), adding an appropriate amount of water thereto for viscosity adjustment, and kneading the mixture with a planetary centrifugal mixer.

The paste for negative electrode was uniformly applied onto a copper foil having a thickness of 20 μm with a doctor blade to a thickness of 150 μm, dried with a hot plate, and then vacuum dried to obtain a negative electrode sheet. The dried electrode was pressed by a uniaxial press at a pressure of 300 MPa (3 t/cm$^2$) to obtain a negative electrode sheet for evaluation of a battery.

[Fine Adjustment of Capacity Ratio Between Positive and Negative Electrodes]

In manufacturing of a lithium ion secondary battery with a positive electrode sheet and a negative electrode sheet opposed to each other, it is necessary to consider capacity balance between both. That is, with a too small negative electrode capacity on the lithium ion receiving side, excess Li deposits on the negative electrode side to cause degradation of the cycle characteristics. Inversely, with a too large negative electrode capacity, the cycle characteristics improve but the energy density decreases due to the charge and discharge in a state with a small load. In order to prevent this, the capacity of the positive electrode sheet was fixed constant, and an amount of discharge per mass of the active material was measured in a half-cell with a counter electrode Li in advance. The capacity of the negative electrode sheet was finely adjusted to have a constant ratio of the capacity of the negative electrode sheet ($Q_A$) to the capacity of the positive electrode sheet ($Q_C$) for the negative electrode sheet of 1.2.

[Making of Cells for Evaluation]

A two-electrode cell and a counter electrode lithium cell were made as follows in a glove box with a dry argon gas atmosphere having a dew point of −80° C. or less maintained therein.

Two-Electrode Cell:

The negative electrode sheet and the positive electrode sheet were punched out to obtain a negative electrode piece and a positive electrode piece having an area of 20 cm$^2$. An Al tab was attached to the Al foil of the positive electrode piece, and an Ni tab was attached to the Cu foil of the negative electrode piece, respectively. A polypropylene microporous film (HIPORE (registered trademark) NB630B, manufactured by Asahi Kasei Corporation) was inserted between the negative electrode piece and the positive electrode piece, which in that state was placed in an aluminum laminate packaging material in a bag form, and an electrolytic solution was poured therein. The opening thereof was then sealed by heat fusion to make a battery for evaluation. The electrolytic solution is a liquid prepared by mixing a mixed solvent of ethylene carbonate, ethyl methyl carbonate, and diethyl carbonate at a volume ratio of 3:5:2 with vinylene carbonate (VC) at 1 mass % and fluoroethylene carbonate (FEC) at 10 mass %, and by further dissolving an electrolyte $LiPF_6$ into the mixture to a concentration of 1 mol/L.

Counter Electrode Lithium Cell:

In a cell with a screwed-type lid made of polypropylene (inner diameter: about 22 mm), the negative electrode sheet punched to a dimeter of 20 mm and a metal lithium foil punched to a diameter of 16 mm were laminated through a separator (polypropylene microporous film (HIPORE (registered trademark) NB630B, manufactured by Asahi Kasei Corporation), and an electrolytic solution was added thereto to make a test cell. The electrolytic solution is a liquid prepared by mixing a mixed solvent of ethylene carbonate, ethyl methyl carbonate, and diethyl carbonate at a volume ratio of 3:5:2 with vinylene carbonate (VC) at 1 mass % and fluoroethylene carbonate (FEC) at 10 mass %, and by further dissolving an electrolyte $LiPF_6$ into the mixture to a concentration of 1 mol/L.

[Measurement of Initial Discharge Capacity and Initial Coulomb Efficiency]

Using a counter electrode lithium cell, the initial discharge capacity and the initial Coulomb efficiency were measured. From a rest potential to 0.005 V, CC (constant current) charging was performed at a current value of 0.1 C.

Next, after switching to CV (constant voltage) charging at 0.005 V, charging was performed with a cut-off current value of 0.005 C. Discharging was performed at a current value of 0.1 C in a CC mode with an upper limit voltage of 1.5 V. The charge and discharge were performed in a thermostat set at 25° C. Herein, the capacity of the discharge for the first time was defined as the initial discharge capacity. Also, the ratio between the amount of electricity in charge and discharge for the first time, i.e., value of amount of electricity discharged/amount of electricity charged expressed as percentage, was defined as the initial Coulomb efficiency.

[Measurement of Charge and Discharge Cycle Characteristics]

The measurement was performed using a two-electrode cell. After aging caused by charging and discharging repeated five times at a current value of 0.2 C, measurement of charge and discharge cycle characteristics was performed by the following method. The charging was performed in a CC (constant current) mode with a current value of 1 C and an upper limit voltage of 4.2 V, and in a CV (constant voltage) mode with a cut-off current of 0.05 C. The discharge was performed in a CC mode with a current value of 1 C and a lower limit voltage of 2.8 V. The charge and discharge operation constituting one cycle was repeated up to 50 cycles to calculate the discharge capacity retention ratio after 50 cycles defined by the following equation.

Discharge capacity retention ratio after 50 cycles (%)=(discharge capacity at 50th cycle/discharge capacity for the first time)×100

The raw materials (nanosilicon-containing particles and graphite particles) of the negative electrode material (composite material particles) and a preparation method thereof are shown below.

[Nanosilicon-Containing Particles]

In a 10-L plastic container, 45 parts by mass of nanosilicon particles (50% particle diameter in number-based cumulative particle size distribution: 90 nm, 90% particle diameter in number-based cumulative particle size distribution: 150 nm) and 55 parts by mass of petroleum pitch (softening point: 214° C., carbonization ratio: 72 mass %, QI content: 0.1 mass %, TI content: 47.8 mass %) were placed to be dry-blended. The powder mixture of nanosilicon particles and petroleum pitch dry-blended was fed into a material hopper of a twin-screw extruder TEM-18SS (manufactured by Toshiba Machine Co., Ltd.). The kneading conditions in the twin-screw extruder include a temperature of 250° C., a screw rotation speed of 700 rpm, and a mixed powder feeding rate of 2 kg/h. During kneading, a nitrogen gas was made to flow at a rate of 1.5 L/min.

The product kneaded with a twin-screw extruder was coarsely crushed with a hammer and then finely pulverized with a jet mill STJ-200 (manufactured by Seishin Enterprise Co., Ltd.) to obtain nanosilicon-containing particles 1. The content of the nanosilicon particles in the nanosilicon-containing particles 1 measured by ICP (inductively coupled plasma) emission spectrometry was 36 mass %, and the 50% particle diameter ($D_{v50}$) in the volume-based cumulative particle size distribution was 10 μm.

[Graphite Particle]

Petroleum-based coke was coarsely crushed with a hammer and pulverized with a bantam mill (manufactured by Hosokawa Micron Corporation, mesh: 1.5 mm). The resultant product was pulverized by a jet mill STJ-200 (manufactured by Seishin Enterprise Co., Ltd.) under the conditions at a pulverizing pressure of 0.6 MPa and a pusher pressure of 0.7 MPa. The pulverized material was heat-treated at 3000° C. in an Acheson furnace to obtain graphite particles ($d_{002}$=0.3357 nm, $L_C$=200 nm, BET specific surface area=11.0 m$^2$/g, $D_{v50}$=4.4 μm).

Example 1

Nanosilicon-containing particles 1 in an amount of 4.4 kg and graphite particles in an amount of 3.8 kg were weighed and fed into a Cyclomix CLX-50 (manufactured by Hosokawa Micron Corporation) to be mixed at a peripheral speed of 24 m/sec for 10 minutes.

An alumina sagger was filled with the mixed powder to be heated up to 1050° C. at 150° C./h under nitrogen gas flow, held for 1 hour, and then cooled to room temperature at 150° C./h. The heat-treated product was collected from the alumina sagger and then pulverized by a bantam mill (manufactured by Hosokawa Micron Corporation, mesh: 0.5 mm) to obtain a composite material A.

Next, 2.4 kg of the composite material A and 5.0 kg of the nanosilicon-containing particles 1 were weighed, fed into a Cyclomix CLX-50 (manufactured by Hosokawa Micron Corporation), and mixed at a peripheral speed of 24 m/sec for 10 minutes to obtain a mixed powder.

An alumina sagger was filled with the mixed powder, heated up to 1050° C. at 150° C./h under nitrogen gas flow, held for 1 hour, and then cooled to room temperature at 150° C./h. The heat-treated product was collected from the alumina sagger and then pulverized by a bantam mill (manufactured by Hosokawa Micron Corporation, mesh: 0.5 mm). From the pulverized material, coarse particles were removed using a stainless steel sieve with 45-μm openings to obtain composite material particles A. The $D_{V50}$, the $D_{V90}$, the specific surface area, and the exothermic peak temperature in DTA measurement of the composite material particles A were measured. These results are shown in Table 1 and FIG. 1.

A counter electrode lithium cell and a two-electrode cell were made using the composite material particles A as a negative electrode active material, and evaluation of battery characteristics (initial discharge capacity, initial Coulomb efficiency, discharge capacity retention ratio after 50 cycles) was performed. The results are shown in Table 1.

Example 2

The nanosilicon-containing particles 1 in an amount of 22.2 g and graphite particles in an amount of 19.0 g were weighed and fed into a rotary cutter mill to be stirred and mixed at a high speed of 25000 rpm (peripheral speed: 150 m/s) for 1 minute while an inert atmosphere was kept with nitrogen gas flowing.

An alumina sagger was filled with the mixed powder to be heated up to 1050° C. at 150° C./h under nitrogen gas flow, held for 1 hour, and then cooled to room temperature at 150° C./h. The heat-treated product was collected from the alumina sagger and then pulverized by a bantam mill (manufactured by Hosokawa Micron Corporation, mesh: 0.5 mm) to obtain a composite material B.

Next, 11.9 g of the composite material B and 25.0 g of the nanosilicon-containing particles 1 were weighed and fed into a rotary cutter mill to be stirred and mixed at a high speed of 25000 rpm (peripheral speed: 150 m/s) while an inert atmosphere was kept with nitrogen gas flowing.

An alumina sagger was filled with the mixed powder, heated up to 1050° C. at 150° C./h under nitrogen gas flow, held for 1 hour, and then cooled to room temperature at 150° C./h. The heat-treated product was collected from the alumina sagger and then pulverized by a bantam mill (manufactured by Hosokawa Micron Corporation, mesh: 0.5 mm). From the pulverized material, coarse particles were removed using a stainless steel sieve with 45-μm openings to obtain composite material particles B.

Subsequently, the material physical properties of the composite material particles B were measured in the same manner as in Example 1 to evaluate the battery characteristics with use of the composite material particles B as a negative electrode material. The results are shown in Table 1.

Comparative Example 1

Nanosilicon-containing particles 1 in an amount of 7.1 kg and graphite particles in an amount of 1.3 kg were weighed and fed into a Cyclomix CLX-50 (manufactured by Hosokawa Micron Corporation) to be mixed at a peripheral speed of 24 m/sec for 10 minutes.

An alumina sagger was filled with the mixed powder to be heated up to 1050° C. at 150° C./h under nitrogen gas flow, held for 1 hour, and then cooled to room temperature at 150° C./h. The heat-treated product was collected from the alumina sagger and then pulverized by a bantam mill (manufactured by Hosokawa Micron Corporation, mesh: 0.5 mm). From the pulverized material, coarse particles were removed using a stainless steel sieve with 45-μm openings to obtain composite material particles C.

Subsequently, the material physical properties and the exothermic peak temperature in DTA measurement of the composite material particles C were measured in the same manner as in Example 1 to evaluate the battery characteristics with use of the composite material particles C as a negative electrode material. These results are shown in Table 1 and FIG. 2.

Comparative Example 2

Nanosilicon-containing particles 1 in an amount of 6.4 kg and graphite particles in an amount of 1.3 kg were weighed and fed into a Cyclomix CLX-50 (manufactured by Hosokawa Micron Corporation) to be mixed at a peripheral speed of 24 m/sec for 10 minutes.

An alumina sagger was filled with the mixed powder to be heated up to 1050° C. at 150° C./h under nitrogen gas flow, held for 1 hour, and then cooled to room temperature at 150° C./h.

The heat-treated product was collected from the alumina sagger and then pulverized by a bantam mill (manufactured by Hosokawa Micron Corporation, mesh: 0.5 mm) to obtain a composite material C.

Next, 7.0 kg of the composite material C and 0.7 kg of petroleum pitch (softening point: 214° C., carbonization ratio: 72 mass %, QI content: 0.1 mass %, TI content: 47.8 mass %) were weighed, fed into a Cyclomix CLX-50 (manufactured by Hosokawa Micron Corporation), and mixed at a peripheral speed of 24 m/sec for 10 minutes.

An alumina sagger was filled with the mixed powder, heated up to 1050° C. at 150° C./h under nitrogen gas flow, held for 1 hour, and then cooled to room temperature at 150° C./h.

The heat-treated product was collected from the alumina sagger and then pulverized by a bantam mill (manufactured by Hosokawa Micron Corporation, mesh: 0.5 mm). From the pulverized material, coarse particles were removed using a stainless steel sieve with 45-μm openings to obtain composite material particles D.

Subsequently, the material physical properties of the composite material particles D were measured in the same manner as in Example 1 to evaluate the battery characteristics with use of the composite material particles D as a negative electrode. material. These results are shown in Table 1.

Comparative Example 3

An alumina sagger was filled with the nanosilicon-containing particles 1, heated up to 1050° C. at 150° C./h under nitrogen gas flow, held for 1 hour, and then cooled to room temperature at 150° C./h. The heat-treated product was collected from the alumina sagger and then pulverized by a bantam mill (manufactured by Hosokawa Micron Corporation, mesh: 0.5 mm) to obtain composite material E.

The composite material E in an amount of 6.7 kg and graphite particles in an amount of 1.3 kg were weighed and fed into a Cyclomix CLX-50 (manufactured by Hosokawa Micron Corporation) to be mixed at a peripheral speed of 24 m/sec for 10 minutes.

An alumina sagger was filled with the mixed powder, heated up to 1050° C. at 150° C./h under nitrogen gas flow, held for 1 hour, and then cooled to room temperature at 150° C./h. The heat-treated product was collected from the alumina sagger and then pulverized by a bantam mill (manufactured by Hosokawa Micron Corporation, mesh: 0.5 mm). From the pulverized material, coarse particles were removed using a stainless steel sieve with 45-μm openings to obtain composite material particles E.

Subsequently, the material physical properties of the composite material particles E were measured in the same manner as in Example 1 to evaluate the battery characteristics with use of the composite material particles E as a negative electrode material. These results are shown in Table 1.

Comparative Example 4

Composite material particles F were obtained in the same manner as in Example 1, except that graphite particles ($d_{002}$=0.3355 nm, $L_c$=109 nm, BET specific surface area=1.8 m²/g, $D_{v50}$=16.8 μm) were used.

Subsequently, the material physical properties of the composite material particles F were measured in the same manner as in Example 1 to evaluate the battery characteristics with use of the composite material particles F as a negative electrode material. These results are shown in Table 1.

TABLE 1

| | Composite material particle | | | | | | Battery characteristics | | |
|---|---|---|---|---|---|---|---|---|---|
| | Amount of nanosilicon particles in composite material particles [mass %] | Amount of amorphous carbon material in composite material particles [mass %] | Exothermic peak temperature in TG-DTA measurement [° C.] | $D_{V50}$ [μm] | $D_{V90}$ [μm] | Specific surface area [m²/g] | Initial discharge capacity [mAh/g] | Initial Coulomb efficiency [%] | Discharge capacity retention ratio after 50 cycles [%] |
| Example 1 | 36 | 46 | 857 | 17.0 | 37.8 | 2.7 | 1133 | 86.8 | 54.1 |
| Example 2 | 36 | 46 | 890 | 13.3 | 25.8 | 3.1 | 1147 | 87.0 | 48.6 |
| Comparative Example 1 | 36 | 46 | 815 | 18.5 | 43.4 | 3.2 | 1200 | 87.9 | 37.2 |
| Comparative Example 2 | 33 | 49 | 780 | 18.2 | 41.3 | 2.3 | 1104 | 86.3 | 34.2 |
| Comparative Example 3 | 37 | 47 | 691 | 13.8 | 21.3 | 6.8 | 1167 | 85.7 | 10.8 |
| Comparative Example 4 | 36 | 46 | 710 | 24.3 | 50.1 | 2.6 | 1095 | 86.0 | 15.8 |

It is shown in Table 1 that in Examples 1 and 2, where composite material particles having an exothermic peak temperature in DTA measurement in a range from 830 to 950° C. were used as negative electrode active material, a lithium ion secondary battery excellent in the initial discharge capacity, the initial Coulomb efficiency, and the discharge capacity retention ratio after 50 cycles can be obtained in comparison with Comparative Examples 1 to 4, where the peak temperature is out of the range.

The results show that, with use of the negative electrode material of the present invention, a lithium ion secondary battery excellent in the initial discharge capacity, the initial Coulomb efficiency, and the cycle characteristics can be provided.

The invention claimed is:

1. A negative electrode material for lithium ion secondary batteries, comprising composite material particles containing nanosilicon particles having a 50% particle diameter ($D_{n50}$) of 5 to 100 nm in the number-based cumulative particle size distribution of primary particles, graphite particles and an amorphous carbon material,
    the composite material particles containing the nanosilicon particles covered with only amorphous carbon material,
    the composite material particles containing the nanosilicon particles at a content of 30 mass % or more and 60 mass % or less, and the amorphous carbon material at a content of 30 mass % or more and 60 mass % or less,
    the composite material particles having a 90% particle diameter ($D_{V90}$) in the volume-based cumulative particle size distribution of 10.0 to 40.0 μm,
    the composite material particles having a BET specific surface area of 1.0 to 5.0 m²/g,
    the composite material particles having an exothermic peak temperature in DTA measurement of 830° C. to 950° C., and no exothermic peak temperature in DTA measurement of less than 830° C.

2. The negative electrode material for lithium ion secondary batteries according to claim 1, wherein the composite material particles have a 50% particle diameter ($D_{V50}$) in the volume-based cumulative particle size distribution of 5.0 to 25.0 μm.

3. The negative electrode material for lithium ion secondary batteries according to claim 1, wherein the graphite particles have a BET specific surface area of 5.0 to 50.0 m²/g.

4. A paste for negative electrodes, comprising the negative electrode material for lithium ion secondary batteries according to claim 1.

5. A negative electrode sheet comprising the negative electrode material for lithium ion secondary batteries according to claim 1.

6. A lithium ion secondary battery comprising the negative electrode sheet according to claim 5.

7. A method for manufacturing a negative electrode material for lithium ion secondary batteries made of composite material particles, comprising the steps of:
    pulverizing a mixture obtained by mixing nanosilicon particles having a 50% particle diameter ($D_{n50}$) in a number-based cumulative particle size distribution of primary particles of 5 to 100 nm and a carbon precursor at a softening point or higher temperature of the carbon precursor to obtain nanosilicon-containing particles comprising the nanosilicon particles covered with only amorphous carbon material (step 1),
    treating a mixture, obtained by mixing the nanosilicon-containing particles and graphite particles, in an inert gas atmosphere at a temperature of 900° C. or more and 1200° C. or less and then pulverizing the processed mixture to obtain composite material particles (composite material particles 1) (step 2), and
    treating a mixture, obtained by further mixing the composite material particles 1 with the nanosilicon-containing particles, in an inert gas atmosphere at a temperature of 900° C. or more and 1200° C. or less and then pulverizing the processed mixture to obtain composite material particles (composite material particles 2) (step 3),
    wherein the composite material particles have an exothermic peak temperature in DTA measurement of 830° C. to 890° C. and no exothermic peak temperature in DTA measurement of less than 830° C.

8. The method for manufacturing a negative electrode material for lithium ion secondary batteries according to claim 7, wherein the carbon precursor is a petroleum pitch or a coal pitch.

* * * * *

UNITED STATES PATENT AND TRADEMARK OFFICE
CERTIFICATE OF CORRECTION

| | |
|---|---|
| PATENT NO. | : 11,777,082 B2 |
| APPLICATION NO. | : 16/753486 |
| DATED | : October 3, 2023 |
| INVENTOR(S) | : Yasunari Otsuka et al. |

It is certified that error appears in the above-identified patent and that said Letters Patent is hereby corrected as shown below:

On the Title Page

Item (54), the title "NEGATIVE ELECTRODE MATERIAL FOR LITHIUM ION SECONDARY BATTERIES, METHOD FOR MANUFACTURING THE SAME, PASTE FOR NEGATIVE ELECTRODE, NEGATIVE ELECTRODE SHEET, AND LITHIUM ION SECONDARY" should be replaced with --NEGATIVE ELECTRODE MATERIAL FOR LITHIUM ION SECONDARY BATTERIES, METHOD FOR MANUFACTURING THE SAME, PASTE FOR NEGATIVE ELECTRODE, NEGATIVE ELECTRODE SHEET, AND LITHIUM ION SECONDARY BATTERY--.

Signed and Sealed this
Fifth Day of December, 2023

Katherine Kelly Vidal
*Director of the United States Patent and Trademark Office*